United States Patent [19]
Dobson et al.

[11] Patent Number: 5,787,992
[45] Date of Patent: Aug. 4, 1998

[54] SPRING TIP SHANK ASSEMBLY HAVING QUICK-DROPPING TRIP-OUT FORCE AND IMPROVED RESETTING ABILITY

[75] Inventors: David A. Dobson; Lyle E. Harper, both of Saskatchewan, Canada

[73] Assignee: Morris Industries Ltd., Saskatchewan, Canada

[21] Appl. No.: 812,275

[22] Filed: Mar. 6, 1997

[51] Int. Cl.$^6$ .................................................. A01B 61/04
[52] U.S. Cl. .......................................... 172/264; 172/705
[58] Field of Search .............................. 172/264, 705

[56] References Cited

U.S. PATENT DOCUMENTS

| | | |
|---|---|---|
| 3,194,323 | 7/1965 | Zimmerman . |
| 3,529,673 | 9/1970 | Morris . |
| 3,700,039 | 10/1972 | Essex et al. . |
| 4,530,406 | 7/1985 | Hake et al. . |
| 4,532,790 | 8/1985 | Nicholls . |
| 5,197,552 | 3/1993 | Di Maria .......................... 172/264 |

OTHER PUBLICATIONS

Morris Brochure entitled "Challenger II Spring Cushion", (date of puclication unknown).
Morris Brochure entitled "Magnum II Chisel Plows", all pages, (date of publication unknown).

*Primary Examiner*—Michael J. Carone
*Assistant Examiner*—Christopher J. Novosad
*Attorney, Agent, or Firm*—Hovey, Williams, Timmons & Collins

[57] ABSTRACT

The spring trip assembly has lever mechanism between the shank and the compression spring which causes the trip-out force of the shank to drop sharply once the relatively high, initial trip-out force level has been reached, thus permitting the shank to slide up and over obstructions without breakage. The compression spring is actuated from both ends simultaneously as the shank rises so that although the trip force drops off quickly, energy also builds up quickly in the spring. Thus, the trip force does not drop as low as it otherwise would, assuring that ample return force is available to reset the shank down into the soil in its working position. Various components of the assembly can be removed and replaced easily without disassembling the entire unit from the tool bar.

28 Claims, 4 Drawing Sheets

SPRING TIP SHANK ASSEMBLY HAVING QUICK-DROPPING TRIP-OUT FORCE AND IMPROVED RESETTING ABILITY

TECHNICAL FIELD

This invention relates to spring-loaded earth-working tillage tools and, more particularly, to tillage shank assemblies of the spring trip type which hold a tillage shank or other tool in the ground with a relatively high trip-out force but which release the tool to prevent damage when an obstacle is encountered, thereafter automatically resetting the tool to its working position after clearing the obstacle.

BACKGROUND

Spring cushion shank assemblies hold the shank in the ground with a yieldable spring force so that the shank can relieve itself by swinging up out of the working position in the event that a hard obstruction is encountered. However, in many spring cushion assemblies, the restoring force of the spring against the tool progressively increases as the tool swings up, thus making it more difficult for the shank to clear the obstacle at the very time it is needed the most. If the restoring force is set lower, the spring may yield too easily and not be able to keep the shank from bouncing as it is dragged through the soil.

Spring trip assemblies, on the other hand, are designed to hold the shank in place with a relatively high trip-out force, which then drops off quickly once trip-out has occurred. The force required to make the shank trip-out is set at a much higher level than the draft force experienced by the shank in normal working conditions. Thus, the shank remains firmly in the soil without bouncing. However, if an obstacle is encountered, the unyielding resistance of the obstacle causes the trip-out force to be reached immediately, whereupon the shank is raised by the obstacle at a lower trip force to the extent necessary to clear the obstacle. Once the obstacle has been passed, the stored energy in the stretched or compressed spring resets the shank in its working position.

Thus, in a spring trip assembly the shank actually becomes easier to raise after its initial high trip-out force has been exceeded. This is very desirable, since it helps assure that there will not be too much spring force to prevent the shank from rising up and over the obstruction to the full extent necessary as the machine continues to move forwardly.

In the past, a variety of linkages, latches and geometries have been used for this purpose, including the arrangement disclosed in expired U.S. Pat. No. 3,529,673 which is owned by the assignee of the present invention. While the spring trip mechanism of that patent does an excellent job of providing a quick-dropping trip force, in some conditions the restoring force of the spring for pushing the shank back down into the ground may fall below that necessary to positively and reliably accomplish that job. Thus, once tripped, the shank may not quite fully reset.

SUMMARY OF THE PRESENT INVENTION

Accordingly, one important object of the present invention is to provide a spring trip tillage tool assembly, particularly but not exclusively for chisel shanks, which is capable of a relative high trip-out force so as to keep the shank steady and "locked down" during most field operations, yet which can trip-out quickly and easily when an obstruction is abruptly encountered, and which has the ability to reliably and dependably reset the shank fully into the working position after the obstruction has been cleared.

Another important object of the present invention is to provide a way of combining the best attributes of spring cushion assemblies with those of spring trip assemblies in a single new unit, while minimizing the negative characteristics of each.

A further important object of the present invention is to provide a spring trip shank assembly which improves upon the principles disclosed in prior U.S. Pat. No. 3,529,673 including, for example, retaining the quick-dropping trip-out force feature of the patented design while making more restoration force available for pushing the shank back down into the soil as it returns to its working position. It is also important to provide a more compact assembly which can be relatively quickly and easily installed or removed from the machine, a longer wearing product requiring less maintenance and repair, a more efficient use of spring force permitting a lighter duty spring to accomplish the same job, a design which will accept and is compatible with standard industry chisel shanks, and a design which permits the removal and replacement of the shank and/or spring unit sub-assemblies without dismantling the entire assembly from the tool bar of the machine.

The foregoing and other important objects of the present invention are carried out through the provision of a shank assembly which makes use of efficient lever mechanism arranged in combination with a double-acting spring unit in which both ends of the spring are actuated simultaneously by the shank as it rises to pass over an obstruction. The geometry of the lever mechanism causes the mechanical advantage of the spring on the shank to decrease rapidly as the shank swings up, thus causing the trip force to correspondingly drop off quickly once the shank has tripped out. However, because the amount of potential energy stored up in the spring increases rapidly as both ends of the spring are actuated simultaneously, the trip force does not drop down as far as it otherwise would. Consequently, the amount of restoration force available to return the shank into the ground is significantly higher than would otherwise be true. The geometry of the various parts and the particular lengths of various moment arms and levers can be selected to achieve a return or restoration force that never drops below the level typically required to completely reinsert the point of the chisel shank back down into the soil and to push it into the working position against the resistance of the soil.

The geometry of the parts of the assembly is such that the shank can achieve a substantial trip height without causing other parts of the assembly to move through extensive ranges of motion, thus reducing wear and prolonging the useful life of the assembly. The assembly is arranged in a relatively upright orientation, having as its primary supporting component a bracket or housing that mounts to the backside of the tool bar or tubular beam of the machine. A block-like shank holder is pivoted to the lower end of the bracket while a rocker lever is pivoted to the upper end of the bracket. A coiled, helical compression spring unit is captured between the shank holder and the inner end of the rocker lever, while a compression link is captured between the holder and the opposite end of the rocker lever. Consequently, as the shank holder is raised after tripping out, the compression link pushes up against the outer end of the rocker lever which, in turn, compresses the spring with the inner end of the lever. Because the moment arm increases for the compression link as the shank progressively swings upwardly, and the moment arms for the spring progressively decrease, the spring becomes progressively easier and easier to compress, assuring that the shank will slip over the encountered obstruction. At the same time, the rapid loading up of the spring by actuating it from both ends simultaneously, preferably in compression, prevents the trip force from dropping too low, which results in more available return force.

The spring unit is designed to be a self-contained subassembly which can be readily removed from the mounting bracket with or without first removing the bracket from the tool bar. Likewise, the compression link has concave retaining saddles at its opposite ends instead of closed eyelets for the corresponding pivot shafts of the assemblies so that, upon releasing the compression force in the link by tightening down a bolt associated with the spring, the compression link may be easily removed without first removing any other parts of the assembly. By pulling a cotter pin in the upper pivot of the rocker lever, the pivot may be removed from the bracket to release the rest of the working components, except for the shank holder.

DETAILED DESCRIPTION

Although the invention as hereinafter described is embodied in a chisel shank assembly, it may be incorporated into other types of tillage tool assemblies as well.

Figures 1, 6, 7:
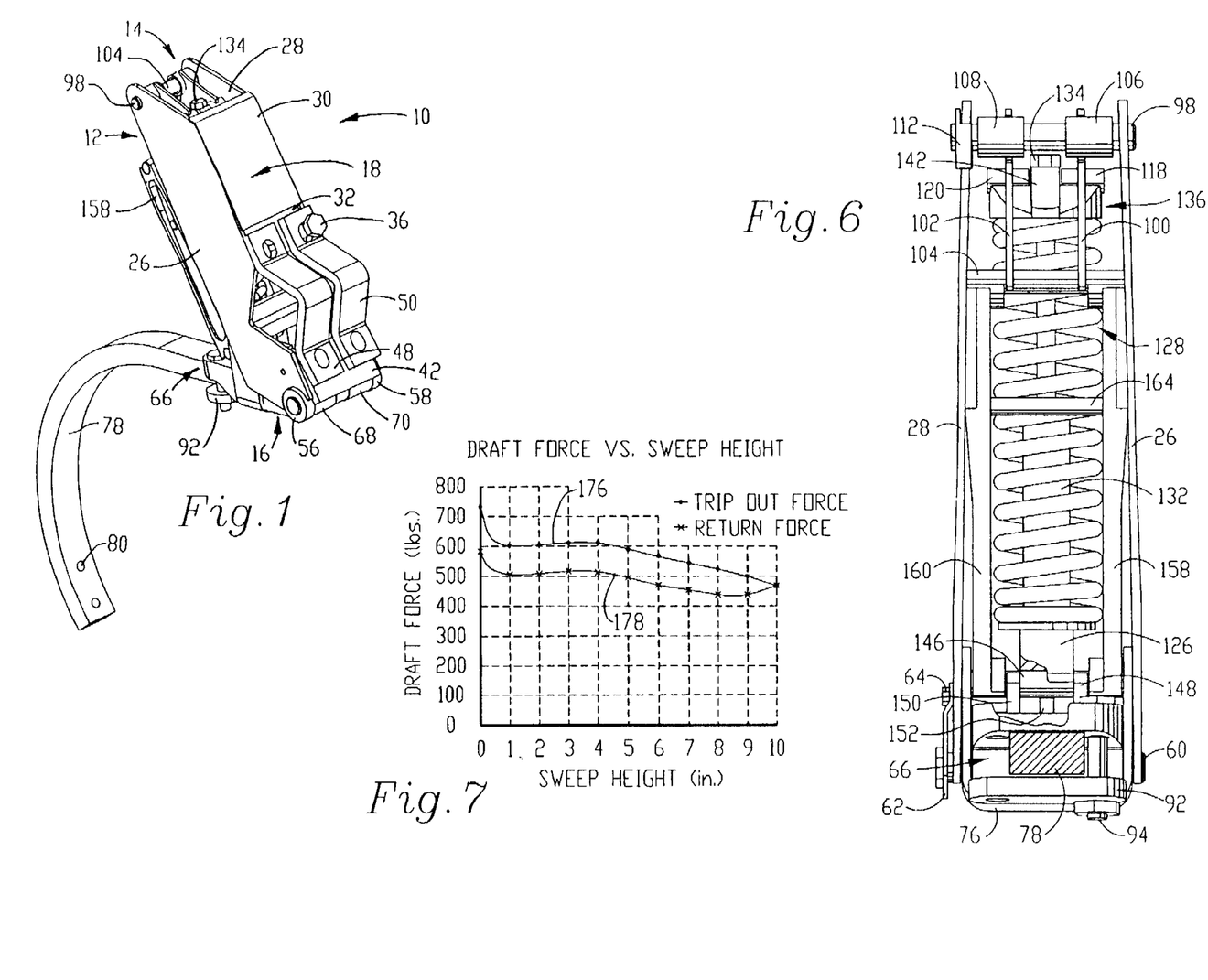
FIG. 1 is a right front perspective view of a spring trip shank assembly constructed in accordance with the principles of the present invention and adapted to be mounted onto the frame member or tool bar of a tillage implement.
FIG. 6 is a rear elevational view of the assembly taken substantially along sight line 6—6 of FIG. 3.
FIG. 7 is a graph of spring trip force versus trip height for the shank assembly of the present invention, together with a graph of return force versus trip height.
Figure 2:
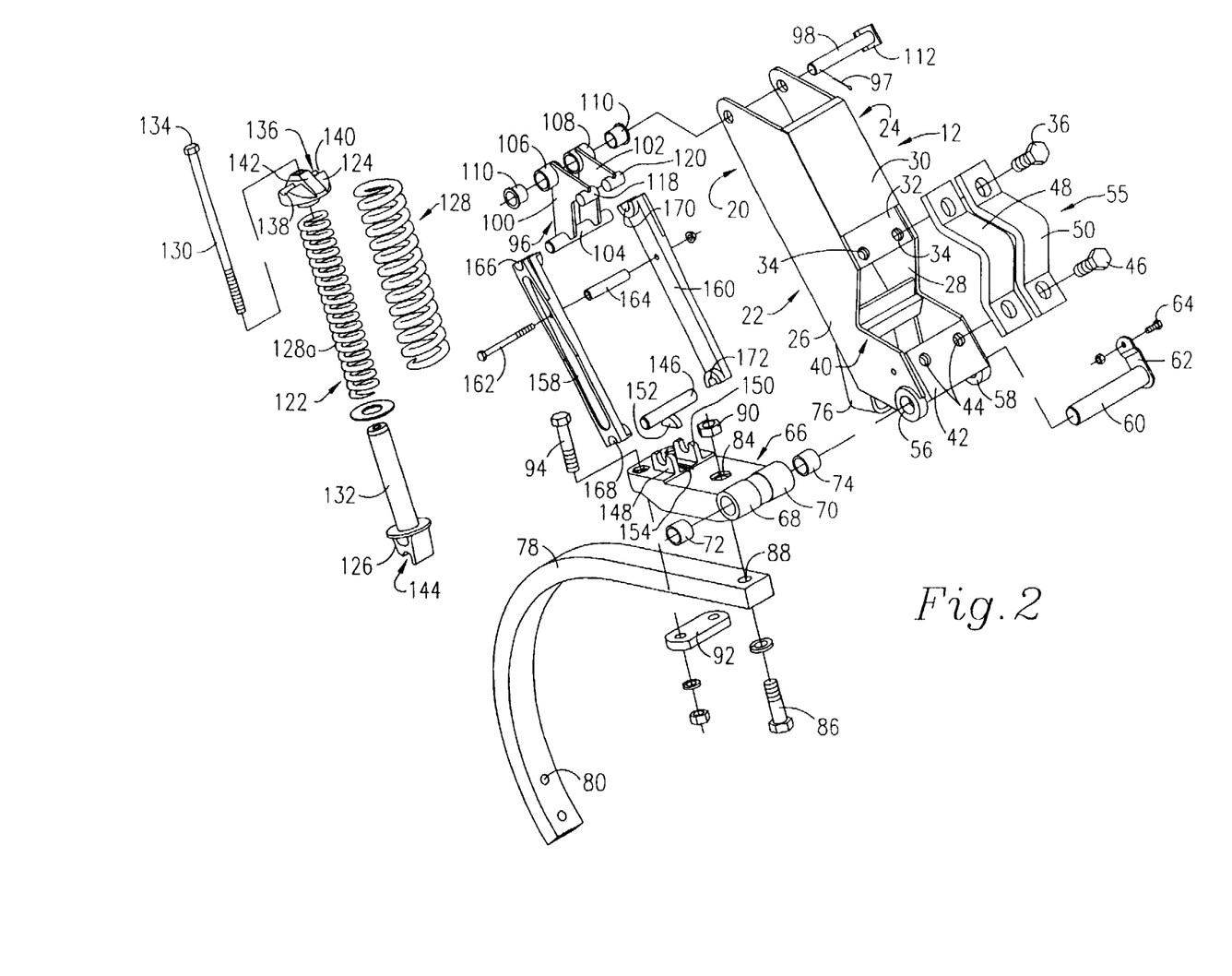
FIG. 2 is an exploded, perspective view of the shank assembly.
Figures 3, 4, 5:
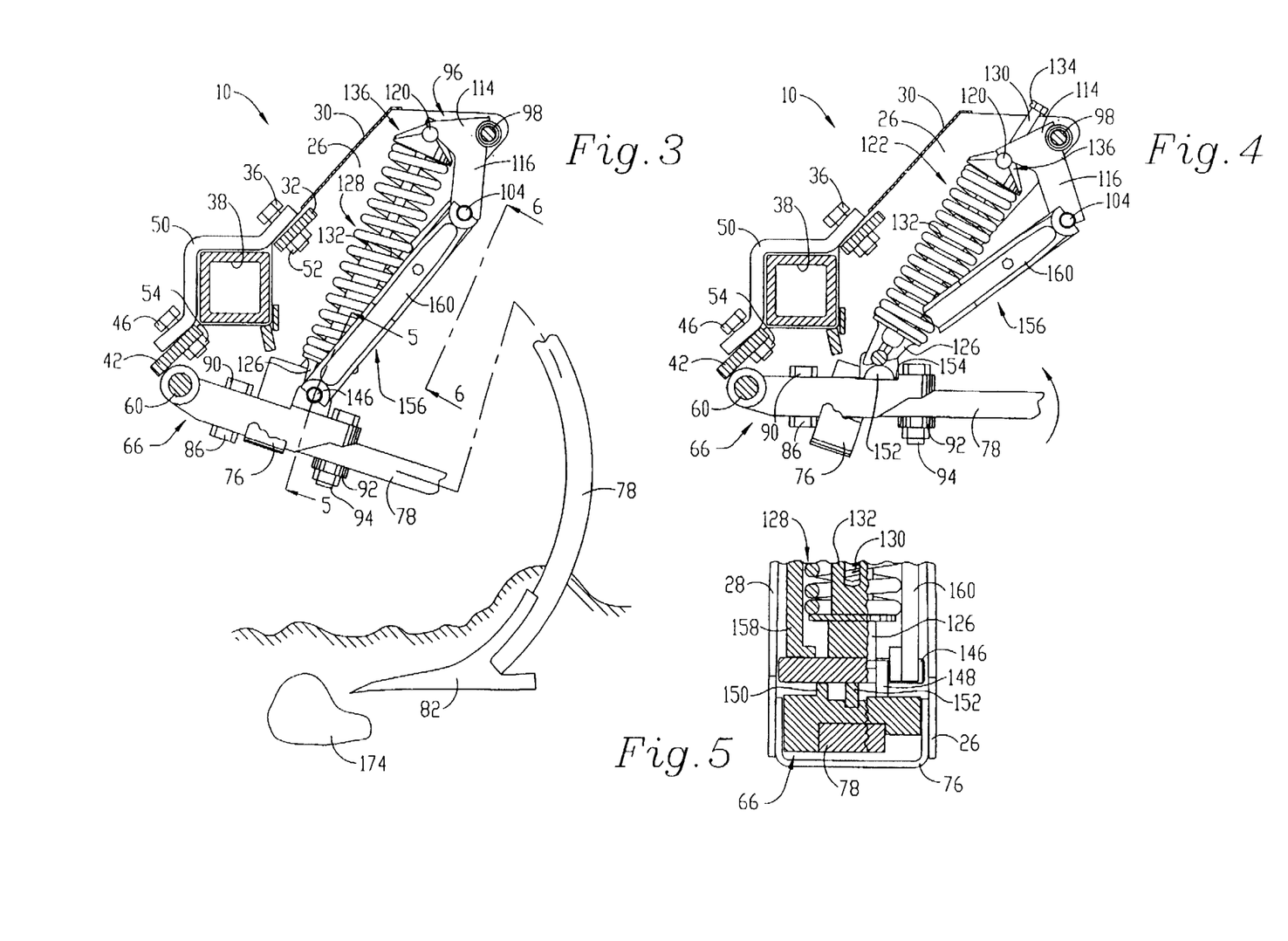
FIG. 3 is a left side elevational view of the shank assembly mounted on the tool bar with the near side wall of the mounting bracket removed and parts shown in cross-section for clarity, the shank being illustrated in its working position.
FIG. 4 is a left side elevational view of the shank assembly similar to FIG. 3 but showing the shank tripped out and partially raised.
FIG. 5 is a fragmentary cross-sectional view of the assembly taken substantially along line 5—5 of FIG. 3.

The shank assembly 10 of the present invention, as shown particularly in FIGS. 1 and 2, includes an elongated, normally generally upright, slightly rearwardly inclined housing or mounting bracket 12, having an upper end 14, a lower end 16, a front 18, and a rear 20. The bracket also includes a pair of opposite sides 22 and 24 extending between upper and lower ends 14,16. The two sides 22 and 24 are defined by a pair of laterally spaced apart side plates 26 and 28 that cooperate to define an interior space within which the compression spring and other components of the assembly are housed, as will be described below. The two sides plates 26 and 28 are completely open across the rear 20 of the bracket, as well as across the upper end 14 and the lower end 16. The front 18, however is partially closed by a front plate 30 that spans the side plates 26 and 28 from a point somewhat below the upper end 14 down to almost the midpoint of the bracket. A cross strap 32 spans the side plates 26 and 28 immediately below the front plate 30 and is slightly recessed with respect thereto as illustrated best in FIGS. 2, 3 and 4. The cross strap 32 has a pair of bolt holes 34, (FIG. 2) for receiving corresponding mounting bolts 36 used in attached the bracket 12 to a tool bar 38 as shown in FIGS. 3 and 4. Immediately below the cross strap 32, the side plates 26 and 28 are notched out to present a receiving notch 40 in bracket 12 that complementally receives the back side and lower face of the tool bar 38. A second cross strap 42 immediately below the notch 40 and spanning the side plates 26,28 has a pair of bolt holes 44 for receiving corresponding mounting bolts 26. The bolts 36 and 46 comprise parts of structure for securing the bracket 12 to the tool beam 38, the remainder of such structure including a pair of angled clamping straps 48 and 50 looped over the front and top sides of the tool bar 38, and bolts 36,46 and nuts 52,54 (FIGS. 3 and 4) for the cross straps 32 and 42.

The mounting bracket 12 has a pair of axially aligned pivot support rings 56 and 58 at its lower end 16, each of which is fixed to a corresponding one of the side plates, 26,28 in such a manner as to present a transverse lower pivot axis. The two rings 56,58 serve as a means for supporting a transverse pivot pin 60 that spans the two rings 56,58 and is held against rotation by a keeper 62 (FIG. 2) at one end thereof. The keeper 62 uses a bolt and nut assembly 64 to anchor the pivot pin 60 to the proximal side plate 28. The pivot pin 60 serves as a mounting pivot for a generally block-shaped shank holder 66 having a pair of axially aligned sleeves 68 and 70 at its front end provided with a pair of internal, corresponding, plastic bushings 72 and 74 which rotatably receive the pivot pin 60. Thus, the shank holder 66 can swing up and down about the pivot pin 60 relative to the bracket 12. A generally U-shaped, rigid strap 76 depending from the bracket 12 is looped under the shank holder 66 and serves as a lower limit stop for downward swinging of the holder 66.

The holder 66 is generally channel shaped along its bottom surface in a fore- and -aft direction to complementally receive and locate a generally C-shaped chisel shank 78. The shank 78 is provided with mounting holes 80 at its lower end for attachment of a suitable tillage tool such as a sweep 82 or other point shown in FIG. 3.

In order to secure the upper end of the shank 78 to the holder 66, the central body of the holder 66 has a bolt hole 84 receiving a bolt 86 that also passes through a hole 88 in the upper end of the shank 78. A nut 90 on the upper end of the bolt 86 is complementally received within a hexagonal upper extremity of the bolt hole 84 to preclude rotation of the nut 90. The shank 78 is also held in place by a lower transverse strap 92 behind the bolt 86 which clamps the shank 78 up against the bottom of the holder 66 through the use of a pair of bolt assemblies 94.

At the upper end 14 of the bracket 12, a rocker lever 96 is swingably mounted between the two side plates 26 and 28. An upper transverse pivot 98 spans the side plates 26 and 28 at this location to serve as a pivot for the rocker lever 96. The pivot 98 is removably retained within the side plates by a cotter pin 97. The rocker lever 96 is comprised of a pair of laterally spaced apart, bell-crank shaped plates 100 and 102 that are secured together along their lower extremity by a cross pin 104. A pair of axially aligned sleeves 106 and 108 are fixed to respective ones of the plates 100,102 at their upper apexes, each of which receives a plastic bushing 110 that rotatably receives the pivot 98. A keeper 112 on one end of the pivot pin 98 prevents the later from rotating during swinging of the rocker lever 96 about the pivot 98.

As noted in FIGS. 3 and 4, for example, the rocker lever 96 is generally inversely L-shaped, presenting one end defined by a short leg 114 that projects generally into the interior of the bracket 12, and an opposite end defined by a longer leg 116 projecting generally outwardly away from the interior of the bracket 12. The inner end of the rocker lever 96 as defined by the leg 114 carries a pair of axially aligned, cylindrical tips 118 and 120 (FIG. 2) on respective ones of the plates 100,102, while the opposite end of the rocker lever 96 as presented by the leg 116 carries the cross pin 104, likewise defining a cylindrical tip.

The mounting bracket 12, the shank holder 66, the rocker lever 96 and the attaching structure 55 collectively define what may be collectively described as a mounting bracket subassembly. The shank 78 and its sweep 82 or other tool may be considered a shank subassembly which can be attached to or coupled with the mounting bracket subassembly via the shank holder 66. Although the rocker lever 96 has been described as comprising part of the mounting bracket subassembly, it will be noted that the rocker lever 96 is detachable from the bracket 12 by simply pulling the cotter pin 97 and releasing the keeper 112.

The shank assembly 10 also includes a spring subassembly comprised by a compression spring unit 122 located between the shank holder 66 and the inner end of the rocker lever 96. The spring unit 122 includes a pair of axially spaced apart end caps 124 and 126 at opposite ends of a helical compression spring 128 (if desired a second, concentrically disposed, smaller diameter, inner compression spring 128a may be used to increase the strength of the spring unit as shown in FIG. 2). A tension bolt member 130 concentrically disposed within the spring 128 is telescoped loosely through the upper end cap 124 and is secured via threads into an upstanding, cylindrical spring guide 132 fixed to the lower end cap 126. The bolt 130 has an enlarged head 134 at its upper end which is disposed on the upper side of the end cap 124 so that when the bolt 130 is threaded down into the spring guide 132, the upper end cap 124 is drawn downwardly toward the lower end cap 126 to adjustably compress and preload the spring 128. On the other hand, the upper end cap 124 is free to slide axially up and down along the bolt 130 when a compressive force is applied to the upper end cap 124.

The upper end cap 124 has a concave, upwardly facing saddle 136 that complementally and pivotally receives the convex tip of the inner end of the rocker lever 96 defined by the two cylindrical tips 118 and 120. The saddle 136 is more particularly defined by a pair of aligned, arcuate depressions 138 and 140 (FIG. 2) on opposite sides of a central, generally triangular boss 142 on the upper end cap 124. The two cylindrical tips 118,120 thus straddle the boss 142, and the bolt 130 passes upwardly through the boss 142 with a head 134 at the uppermost extremity of the boss 142. The aligned tips 118 and 120 define a upper spring pivot for the spring 128 and serve to operably connect the spring 128 with the lever 96.

On the other hand, the lower end cap 126 has a generally C-shaped, downwardly facing saddle 144 that is complementally received on a cross pin 146 supported between a pair of laterally spaced apart, upstanding cradles 148 and 150 on the top side of the shank holder 66. A stabilizer key 152 (FIG. 2) fixed to the underside of the cross pin 146 is received within a mating groove 154 in the top surface of the holder 66 between the cradles 148 and 150 to preclude rotation of the cross pin 146 and prevent axially shifting thereof. The cross pin 146 defines a lower spring pivot for the spring 128 and serves to operably interconnect the spring 128 and the holder 66.

Due to the open-ended nature of the saddles 136 and 144 at opposite ends of the spring unit 122, the spring unit 122 is removably captured between the rocker lever 96 on the one hand and the shank holder 66 on the other hand. As long as the cylindrical tips 118,120 of the rocker lever 96 are maintained within the depressions 138,140 of the upper end cap 124 and the cross pin 146 of the shank holder 66 is maintained within the saddle 144 of the lower end cap 126, the spring unit 122 will remain in place within the shank assembly 10. However, if the rocker lever 96 is unseated from the upper end cap 124, the entire spring unit 122 may be lifted off the shank holder 66 and out of the bracket 12.

The shank assembly 10 further includes a compression link member 156 between the outer end of the rocker lever 96 and the shank holder 66 in the form of a pair of links 158 and 160. The two links 158 and 160 are interconnected by a cross bolt 162 (FIG. 2), while a tubular spacer 164 (FIG. 2) encircles the cross bolt 162 and is disposed between the links 158,160 to maintain their separation and provide structural integrity to the compression member 156. The upper end of the link 158 has a concave saddle 166 that rotatably receives the proximal end of the cross pivot 104 of the rocker lever 96, while the lower end of the link 158 has a concave saddle 168 that rests upon and rotatably receives the corresponding end of the cross pivot 146 associated with the shank holder 66. The other link 160 has similar upper and lower saddles 170 and 172 respectively.

As a consequence of this construction of the compression member 156 it will be seen that the member 156 comprises another removable subassembly of the shank assembly 10. As long as the cross pivot 104 of rocker lever 96 is seated within the upper saddles 166,170 of the compression member 156 and the lower cross pivot 146 is seated within the lower saddles 168 and 172 of the compression member 156, the compression member 156 will remain in place between the rocker lever 96 and the shank holder 66. However, due to the open ended nature of the saddles of the compression member 156, the member is easily removed from the assembly when compressive loading is removed from its opposite ends, such as by tightening down the draw bolt 130 to such an extent that the compression spring 128 no longer exerts an upward force against the rocker lever 96 when the shank 78 is in its lowered working position against the stop 76 as in FIG. 3.

OPERATION

Referring particularly to FIGS. 3 and 4, it will be seen that when the shank assembly 10 is placed in use, the compression spring 128 pushes the shank holder 66 downwardly about pivot 60 to the extent permitted by the stop 76. In this respect, the lower end of the spring 128 pushes downwardly through the lower end cap 126 against the lower spring pivot 146, while the upper end of the spring 128 pushes upwardly through the upper end cap 124 against the upper spring pivot defined by tips 118,120, which in turn exerts downward force against the lower spring pivot 146 via the rocker lever 96 and the compression link 156. The shank holder 66, the compression link 156, and the rocker lever 96 thus broadly serve as apparatus operably interconnecting the spring 128 and the shank 78.

If the point 82 hits an obstruction 174 (FIG. 3) and the resistance of the obstruction 174 is high enough to trip-out the shank 78, shank 78 will swing upwardly in a counterclockwise direction about the shank pivot 60 to the extent necessary to clear the obstruction, and will then reset itself back down in the working position of FIG. 3. In the process, the two end caps 124 and 126 compress the spring 128 from opposite directions to quickly store up potential energy within the spring, which is then exerted against the shank 78 as it is returned to its working position.

In the working position of FIG. 3, the spring 128 is under compression. The amount of compression determines the trip-out force for the shank 78 and can be varied by selecting different spring resistances and dimensions for the rocker lever 96 and compression link 156. Preferably, the trip-out force is established at a relatively high level compared to the typical draft force exerted by the ground on the shank 78 so that in normal conditions the shank will stay down in its working position.

Figures 3A, 4A:
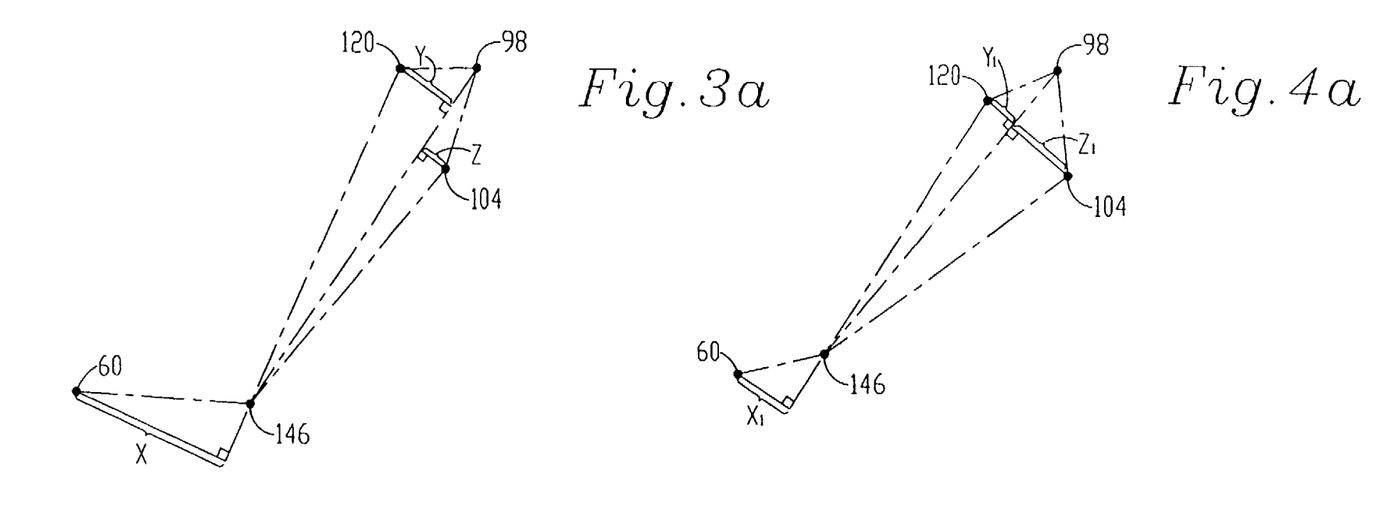
FIG. 3a is a schematic diagram illustrating the geometrical relationship of the components of the assembly in the FIG. 3 position.
FIG. 4a is a schematic diagram illustrating the components in the FIG. 4 position.

As shown in FIG. 3A, when the shank 78 is in its working position the moment arm of the line of action of the spring acting through pivot 146 has a length "X", while the moment arm of the line of action of the spring acting through the rocker lever pivot 98 has a length "Y". Additionally, the amount of "offset" of the lever pivot 104 to an imaginary line interconnecting the lower spring pivot 146 and the upper lever pivot 98 has a value "Z".

As the shank 78 is tripped-out, the offset of the outer lever pivot 104 increases rapidly to an amount "Z1", while the moment arms X and Y both decrease to the values "X1" and "Y1". Therefore, although potential energy is being stored up in the spring 128 at this time, the mechanical advantage of the spring over the shank decreases dramatically so that the net effect is to decrease the trip force required to move the shank upwardly, once the initial trip-out level has been reached. This is illustrated in FIG. 7 by the descending curve 176, which is a plot of the trip-out force verses the height of the shank as it swings upwardly about the shank pivot 60. Although the numbers associated with the graph in FIG. 7 are for illustrative purposes only, it will be seen that the trip-out force is approximately 750 pounds when the shank is fully down in the working position at "0" height. However, by the time the shank has raised only 1 inch, the amount of force required to swing the shank upwardly has dropped to 600 pounds. Thereafter, the trip force stays fairly flat, gradually dropping down to approximately 450 pounds at a 10 inch trip height. Thus, rather than the compressive loading on the spring making it harder for the shank to clear the obstruction, there is actually an immediate drop-off of the effective holding force of the spring against the shank to make it easier for the shank to slip up over the obstacle.

It will be noted that, although the trip force drops off very quickly, it does not drop too far. This is due in part to the fact that although the geometry of the components of the trip assembly cause the mechanical advantage of the spring on the shank to be decreased as the shank swings upwardly, the spring 128 is loaded up at a rapid rate due to the fact that it is being actuated from both ends as the shank rises. In prior known spring cushion assemblies, only the bottom end of the spring has been compressed while the upper end remained stationary. In the present arrangement, however, the upper end is compressed as well, resulting in a rate of energy build-up that is, for example, twice as fast as in prior arrangements for the same amount of trip height of the shank. Consequently, although the spring, in effect, loses some of its leverage over the shank as the shank rises, this is offset by the rapid build-up of energy within the spring 128 to keep the trip force from dropping too low.

Thus, after the obstacle has been cleared, there is more than ample force available from the spring 128 to reset the shank down in its working position. Even though the soil resists the re-entry of the point 82 down into the ground and forward movement into the fully reset position of FIG. 3, the additional energy stored up within the spring 128 by virtue of the present design can overcome such resistance.

The "trip force" as that term is used herein is defined as the amount of force required at any given trip height to make the shank swing up. The graph in FIG. 7 shows that trip force, represented by curve 176, is generally higher at all points of shank height than return force which is denoted by the curve 178. This disparity between trip force and return force arises from friction that exists within the shank assembly. If the friction force were zero at the pivot points 60, 120, 98, 104 and 146 and other places, the trip force and the return force would substantially coincide. However, since this is not the case, the trip force at all points along the curve 176 is the total of the effective resistive force offered by the spring 128 plus the resistive force provided by the friction in the joints.

On the other hand, the "return force" as that term is used herein, is the force available at any given trip height to push the shank back down into the ground. Thus, the total return force available at each trip height to push down on the shank is the force from the spring 128 minus the resistive drag exerted by friction in the joints. Consequently, as shown in FIG. 7, the return force represented by curve 178 runs below the trip-out force at every individual trip height (except the 10 inch height which is the fully tripped position). Since 400–450 pounds at the 4-inch depth is typically needed in order to keep the shank in the ground, it will be seen that there is more than ample return force available in the present invention to assure full resetting of the shank 78 once the obstruction has been cleared.

It will be noted that the preferred embodiment of the shank assembly as disclosed herein is easy to service in the event that parts need replacing. For example, the shank itself can readily be removed and replaced by loosening the bolts 86 and 94. The spring unit 122 can be removed by first tightening down the draw bolt 130 until such time as the spring 128 loses its compressive force in opposite directions against the lower pivot 146 and the upper pivot 118,120. Then the rocker lever 96 is removed from the bracket 12 by pulling the cotter pin 97 (FIG. 2) and withdrawing the pivot 98. Once rocker lever 96 is gone, the self-contained spring unit 122 can simply be lifted off the holder 66 due to the open saddle 144 at the lower end of the spring unit.

If it is desired to remove the compression link 156 without also removing the spring unit 122 and the rocker lever 96, that can be readily accomplished by first tightening down on the draw bolt 130 to remove compressive loading on the link 156.

After removing the cross bolt 162, either or both of the links 158, 160 may be pulled out of the assembly.

Thus, there is no need to completely remove the shank assembly 10 from the tool beam 38 in order to replace the major working parts of the trip mechanism. In addition, the spring unit 122 and the compression link 156 can be readily removed without first removing the shank holder 66 and the rocker lever 96. This greatly facilitates servicing and reduces down time, which is always an important consideration in farming operations.

We claim:

1. A spring trip tillage tool assembly for mounting on a supporting beam of a tillage implement comprising:

a mounting bracket;

structure for attaching the bracket to the beam;

a tillage tool pivotally attached to the bracket by a transverse tool pivot for upward swinging movement away from a working position after the tool is tripped out and downward swinging movement toward the working position as the tool is returned;

a double-acting spring having a pair of opposite, load-receiving ends jointly movable in mutually opposite directions as the spring is actuated whereby to cause a progressively increasing amount of energy to be stored in the spring; and apparatus operably coupling the tool with said opposite ends of the spring for effecting said actuation of the spring as the tool is raised and for holding the tool in the working position unless a predetermined trip-out force is applied against the tool, said apparatus and the spring being disposed to quickly decrease the mechanical advantage of the spring as the tool moves upwardly yet quickly increase the amount of energy stored in the spring such that the trip force required to raise the tool out of the working position drops off sharply when the tool trips out but the return force available to push the tool back into the ground remains sufficiently high to accomplish complete return of the tool to the working position.

2. The spring trip tillage tool assembly as claimed in claim 1, said spring comprising a helical compression spring.

3. The spring trip tillage tool assembly as claimed in claim 2, said apparatus including a pair of transverse spring pivots at said opposite ends of the spring, a line of action of the spring extending through and interconnecting said spring pivots, the tool being operably connected with a tool end of the spring by one of said spring pivots for comprising said tool end of the spring and decreasing a moment arm between said line of action of the spring and the tool pivot as the tool is raised.

4. The spring trip tillage tool assembly as claimed in claim 3, said apparatus further including a lever pivotally attached to the bracket for swinging movement about a transverse lever pivot, one end of said lever being operably connected with a lever end of said spring by the other of said spring pivots, said apparatus further including a link operably interconnecting the tool and another end of the lever for compressing the lever end of the spring as the tool is raised and decreasing a moment arm between the line of action of the spring and the lever pivot.

5. The spring trip tillage tool assembly as claimed in claim 4, said link being operably connected to the tool by said one spring pivot.

6. The spring trip tillage tool assembly as claimed in claim 5, said link comprising a compression link.

7. The spring trip tillage tool assembly as claimed in claim 6, said link being retained in place between the lever and the tool by the force of said spring, said bracket having a stop disposed to prevent downward swinging of the tool beyond a point at which the spring force is effective to retain the link in place.

8. The spring trip tillage tool assembly as claimed in claim 7, said lever having a generally convex tip associated with said another end, said link having a pair of saddles at opposite ends thereof configured to complementally receive and bear against said convex tip of the lever and said one spring pivot.

9. The spring trip tillage tool assembly as claimed in claim 8, said spring being retained in place between the tool and the lever by the force of the spring, said spring having an a pair of caps at opposite ends thereof, said caps each having a saddle for pivotally bearing against and removably receiving a corresponding spring pivot.

10. The spring trip tillage tool assembly as claimed in claim 9, one of said caps having a tension member extending axially through the spring and having a slip connection with the other cap, said tension member having an abutment disposed on the outside of said other cap for limiting movement of the other cap away from said one cap, said tension member being adjustably secured to the one cap for adjusting the preload of the spring by changing the position of said other cap relative to the one cap.

11. The spring trip tillage tool assembly as claimed in claim 1, said tillage tool comprising a generally C-shaped shank, said shank being pivotally attached to the bracket by an intermediate shank holder, said holder being pivotally secured to the bracket by said tool pivot and having a fastener fixedly securing the shank to the holder.

12. The spring trip tillage tool assembly as claimed in claim 1, said bracket being elongated and having an upper end, a lower end, a front, and a back, said structure being disposed on the front of the bracket for attaching the bracket to the beam in such a manner that the bracket is located generally on the backside of the beam with the longitudinal axis of the bracket disposed in a generally upright condition, said tool pivot being located at the lower end of the bracket.

13. The spring trip tillage tool assembly as claimed in claim 12, said tillage tool comprising a generally C-shaped shank, said apparatus including a shank holder fixed to the shank and pivoted to the bracket by said tool pivot, said spring comprising a helical compression spring, said apparatus further including:
  a lever pivotally attached to the upper end of the bracket for swinging movement about a transverse level pivot,
  an upper transverse spring pivot operably connecting an upper end of the spring with one end of the lever,
  a lower transverse spring pivot operably connecting a lower end of the spring with said shank holder, and
  a compression link operably interconnecting the shank holder and another end of the lever,
  a line of action of the spring extending through and interconnecting said spring pivots,
  said lower spring pivot being disposed to compress the lower end of the spring and decrease a moment arm between the line of action of the spring and the tool pivot as the shank holder is raised, and the upper spring pivot being disposed to compress the upper end of the spring and decrease a moment arm between the line of action of the spring and the lever pivot as the shank holder is raised.

14. The spring trip tillage tool assembly as claimed in claim 13, said compression link being disposed between said lower spring pivot and said another end of the lever.

15. A spring trip tool assembly mountable on a transverse supporting beam of a tillage implement comprising:

an elongated mounting bracket having an upper end, a lower end, a front, and a back;

mounting structure on the front of the bracket for attaching the assembly to the beam in such a manner that the bracket is located generally on the backside of the beam with the longitudinal axis of the bracket disposed in a generally upright condition;

a shank holder;

a generally C-shaped tillage shank fixed to the holder;

a lower transverse pivot swingably attaching the holder to the lower end of the bracket to permit raising and lowering of the shank relative to the bracket;

a lever having a pair of opposite ends;

an upper transverse pivot swingably attaching the lever to the upper end of the bracket for rocking movement about an upper transverse axis located between the opposite ends of the lever;

a double-acting compression spring operably disposed between the holder and one end of the lever; and a compression link operably disposed between the holder and the opposite end of the lever, said spring being operable to hold the shank down in a working position unless a draft load on the shank in the working position reaches a predetermined trip-out force, said holder and said lever being operable to compress the spring from opposite directions as the shank is swung up away from the working position and to decrease the mechanical advantage of the spring on the shank such that the trip force required to raise the shank out of the working position drops off sharply when the shank trips out but the return force available to push the shank back into the ground remains sufficiently high to accomplish complete return of the shank to the working position.

16. The spring trip tool assembly as claimed in claim 15, said link being retained in place between the lever and the holder by the force of said spring, said bracket having a stop disposed to prevent downward swinging of the shank beyond a point at which the spring force is effective to retain the link in place.

17. The spring trip tool assembly as claimed in claim 16, said opposite end of the lever having a generally convex tip, said holder having a generally convex part, said link having a pair of saddles at opposite ends thereof configured to complementally receive and bear against said convex tip of the lever and said convex part of the holder.

18. The spring trip tool assembly as claimed in claim 15, said spring comprising a helical compression spring that is part of a spring unit subassembly that additionally includes a pair of spaced end caps confining the compression spring therebetween and a tension member adjustably linking said end caps together, said tension member being operable to adjustably draw the upper end cap down toward the lower end cap against the action of the compression spring or allow the compression spring to adjustably shift the upper end cap upwardly along the tension member and away from the lower end cap, said holder being disposed to depress said lower end cap and said one end of the lever being disposed to depress said upper end cap as the tool is raised away from said working position.

19. The spring trip tool assembly as claimed in claim 18, said one end of the lever making an operating connection with said upper end cap by bearing forcibly against the upper end cap.

20. The spring trip tool assembly as claimed in claim 19, said link being retained in place between the lever and the holder by the force of said spring, said bracket having a stop disposed to prevent downward swinging of the tool beyond a point at which the spring force is effective to retain the link in place.

21. The spring trip tool assembly as claimed in claim 20, said opposite end of the lever having a generally convex tip, said holder having a generally convex part, said link having a pair of saddles at opposite ends thereof configured to complementally receive and bear against said convex tip of the lever and said convex part of the holder.

22. The spring trip tool assembly as claimed in claim 15, said spring and said lever being so disposed that the resistance exerted by the spring against said one end of the lever is applied through a progressively decreasing moment arm as the tool is swung up away from the working position.

23. The spring trip tool assembly as claimed in claim 22, said spring and said compression link having longitudinal axes that intersect at substantially the same point on said holder within the plane of swinging movement of the tool, said point of intersection and said upper pivot of the lever having an imaginary line that interconnects the same and becomes progressively shorter as the tool is raised, said one end of the lever having a pivot point with the spring that moves progressively closer to said imaginary line as the tool is raised, and said other end of the lever having a pivot point with the link that moves progressively farther away from the imaginary line as the tool is raised.

24. The spring trip tool assembly as claimed in claim 15, said holder having a lower transverse spring pivot operably coupling the holder with a lower end of the spring, said one end of the lever having an upper transverse spring pivot operably coupling the lever with an upper end of the spring.

25. The spring trip tool assembly as claimed in claim 24, said compression link being disposed between said opposite end of the lever and said lower transverse spring pivot.

26. A spring trip tool assembly mountable on a transverse supporting beam of a tillage implement comprising:

a mounting bracket subassembly including:

an elongated mounting bracket having an upper end, a lower end, a front, and a back;

mounting structure on the front of the bracket for attaching the subassembly to the beam in such a manner that the bracket is located generally on the backside of the beam with the longitudinal axis of the bracket disposed in a generally upright condition;

a tool holder;

a lower transverse pivot swingably attaching the holder to the lower end of the bracket for up and down movement; and a limit stop at the lower end of the bracket in position to block further downward swinging of the holder beyond a certain point;

a lever subassembly including:

a lever having a pair of opposite ends;

an upper transverse pivot swingably attaching the lever to the upper end of the bracket for rocking movement about an upper transverse axis located between said opposite ends of the lever; and a retainer for releasably securing the pivot on the bracket;

a shank having an upper end, said holder having fastening structure detachably securing said upper end of the shank to the holder so that the shank may swing about said lower pivot with the holder;

a spring unit subassembly including:

a pair of spaced apart, upper and lower end caps;

a tension member interconnecting said end caps;

a double-acting, helical compression spring encircling the tension member and confined between the end caps, said tension member having a lower end secured to the lower end cap and an upper end telescoped through the upper end cap, said upper end of the tension member having an abutment located above the upper end cap to limit movement of the upper end cap by the spring upwardly away from the lower end cap, said tension member being secured to the lower end cap in a manner to permit the abutment to be adjustably shifted toward or away from the lower end cap whereby to adjust the preload of the spring against the opposite end caps, each of said end caps having an outwardly facing, generally concave saddle; and a compression link having a pair of outwardly facing, generally concave saddles at its opposite upper and lower ends, said one end of the lever having a generally convex tip matingly configured with respect to said saddle on the upper end cap.

said other end of the lever having a generally convex tip matingly configured with respect to said saddle on the upper end of said link.

said holder having a generally convex part matingly configured with respect to said saddle on the lower end cap and said saddle on the lower end of the link.

said spring unit subassembly being disposed between said one end of the lever and the holder.

the convex tip of the one end of the lever being pivotally received within the concave saddle on the upper end cap, and the convex part on the holder being pivotally received within the concave saddle on the lower end cap so that the spring is compressed from opposite directions by the shank holder and the lever when the shank is raised.

said link being disposed between said other end of the lever and the holder.

the convex tip of the other end of the lever being pivotally received within the concave saddle on the upper end of the link, and the convex part on the holder being pivotally received within the concave saddle on the lower end of the link.

said compression spring being operable through its preloaded spring force to cause the spring unit subassembly and the link to be removably retained in place within the tool assembly if the adjustment on the spring unit subassembly is such that the spring is under compression when the holder is down against the lower limit stop and the concave saddles on the end caps are in mating engagement with the convex tip of the one end of the lever and the convex part on the holder respectively.

27. The spring trip tool assembly as claimed in claim 26, said spring being operable to hold the shank down in a working position unless a draft load on the shank in the working position reaches a predetermined trip out force, said link and said lever being operable to compress the spring with a progressively increasing moment arm as the shank is swung up away from the working position whereby to decrease the draft load required to raise the tool once the shank has been tripped out.

28. The spring trip tool assembly as claimed in claim 27, said spring, said shank and said lever being so disposed that the forces exerted by opposite ends of the spring against the lever and the holder are applied through progressively decreasing moment arms as the shank swings up away from the working position.

* * * * *